United States Patent [19]
Gianni

[11] 3,892,999
[45] July 1, 1975

[54] POWER SOURCE FOR ELECTRONIC FLAME DETECTION DEVICES AND THE LIKE

[75] Inventor: Bianchini Gianni, Reggio Emilia, Italy

[73] Assignee: Societa Italiana Elettronica S.p.A., Milan, Italy

[22] Filed: Feb. 13, 1974

[21] Appl. No.: 442,105

[30] Foreign Application Priority Data
May 22, 1973 Italy.................................. 24390/73

[52] U.S. Cl................................. 315/149; 315/159
[51] Int. Cl. ........................................... H05b 41/36
[58] Field of Search ............ 315/159, 149, 156, 157

[56] References Cited
UNITED STATES PATENTS

| | | | |
|---|---|---|---|
| 2,810,097 | 10/1957 | Rabinow.......................... | 315/159 X |
| 2,892,971 | 6/1959 | Vasel................................. | 315/159 X |
| 3,206,650 | 9/1965 | Miller et al..................... | 315/149 X |

Primary Examiner—Nathan Kaufman
Attorney, Agent, or Firm—Ostrolenk, Faber, Gerb & Soffen

[57] ABSTRACT

In flame detection devices using ionization tubes which measure radiation emitted by the flame, a d-c power source is connected to the ionization tube by current limiting means for abruptly extinguishing the discharge of the ionization tube promptly after its ignition. Energy storing means are provided for storing energy during non-ignition periods sufficient to provide a pulse of sufficient strength to actuate a remotely located indicator device and of a duration which represents the duration of tube ignition. Impedance matching means are provided for matching the detector impedance to the lines which impedance matching means is selected to prevent undesirable oscillation which might otherwise occur due to the presence of the impedance matching means and the energy storing means.

6 Claims, 7 Drawing Figures

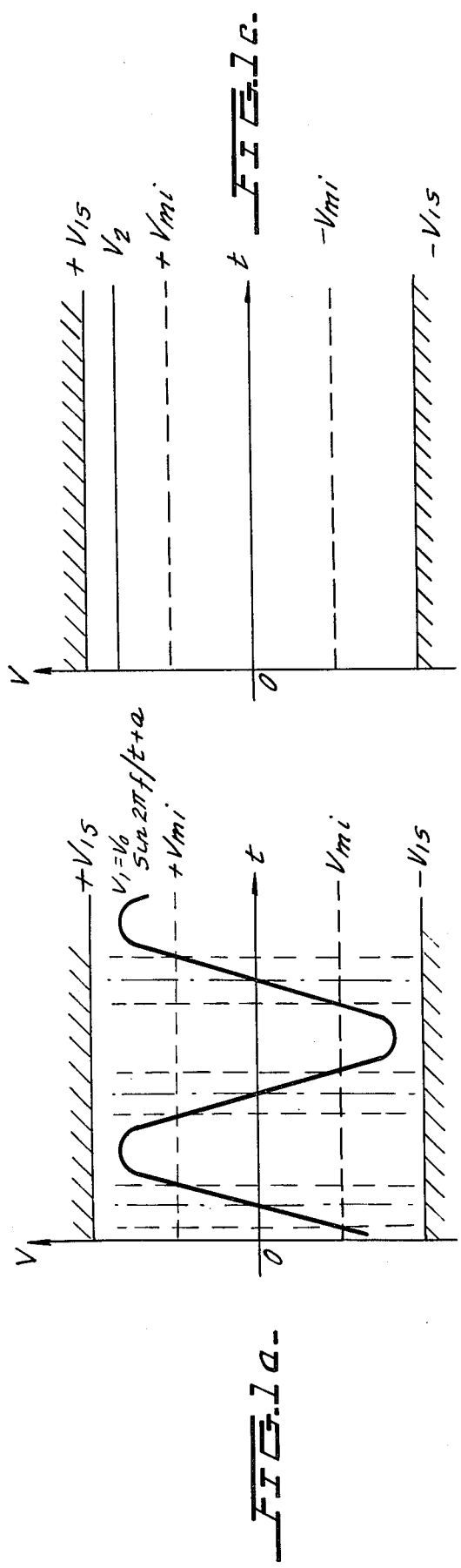
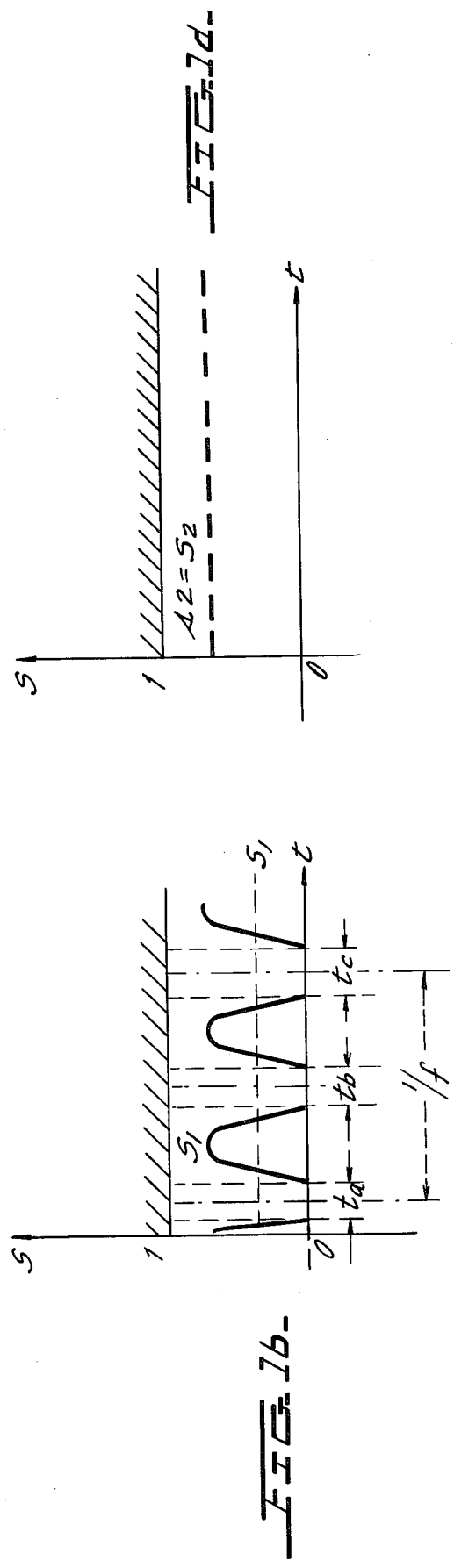

POWER SOURCE FOR ELECTRONIC FLAME DETECTION DEVICES AND THE LIKE

The present invention refers to a device employing ionization tubes for radiation detection which are particularly useful in systems for checking for presence of flame in combustion installations, and more particularly to a power source and circuit for such detectors to assure their operation at maximum sensitivity and efficiency.

BACKGROUND OF THE INVENTION

In order to provide an efficient system for detecting the presence of flame, a detector must be provided which is capable of recognizing with utmost sensitivity the characteristic radiations of the flame under examination, even when it manifests itself in extremely diverse ways. On the other hand, the detector must be entirely insensitive to that radiation generally present in a high-temperature combustion chamber which may result in erroneous flame detection.

It is further necessary that the control system connected to the various detectors have a response to the radiation such as to be able to discriminate between the flame of one burner (main or pilot) from that of another physically adjacent burner or burners, and that the transducer is able to respond promptly, so as to be able to signal with the utmost rapidity any disappearance of the flame controlled by it.

The radiation emitted by flames encompass a wide range comprising infrared, luminous and ultraviolet light.

A great variety of detection devices exist, based either on the emission of infrared radiation by the flame, or on the emission of ultraviolet radiation by the flame which radiation is smaller from a quantitative viewpoint but is more significant from a qualitative viewpoint. In fact such radiation cannot be confused with other spurious radiation present in the combustion chamber due to reasons other than the presence of the flame and they are emitted only by a well defined zone of the flame, thus permitting efficient discrimination between and among neighboring flames.

For systems employing ultraviolet detection means it is common to utilize a special type of ionization tube as the primary detector element. Such ionization tubes consist of an envelope which is transparent to ultraviolet radiation and in which an electric discharge occurs to generate a pulse signal whenever a quantum of ultraviolet radiation, of a wave length lying within a narrow band, ionizes an atom of gas in the zone of the electrodes of the tube if a potential difference greater than a certain minimum value exists across the electrodes.

From a practical viewpoint and from a safety viewpoint, it is particularly important to be able to obtain with such a primary element a detector having maximum sensitivity and a most suitable response curve for reliable discrimination.

In addition thereto it is highly desirable to employ an electric circuit which is as simple in design as is practically possible so as to minimize the specialized electronic components, which, together with the tube are operated within the vicinity of the flame and hence in a region of high ambient temperature thereby effecting the transmission of the signals to the remaining part of the flame detector unit typically referred to as the control station which is quite often connected to the detector unit through the means of a long connecting line.

The limiting factor of many conventional designs of equipment presently used for this purpose is the intermittent operation of the tube. In such devices, the extinction of the avalanche discharge triggered by a quantum of radiation is obtained by applying to the tube, either directly or through a resonance circuit, an alternating current, typically at line frequency, or at the resonance frequency of the circuit.

Under such conditions and regardless of the frequency of the polarization voltage, it is evident that at all moments close to the passage of the voltage waveform through zero, the tube remains completely insensitive to the radiation since the potential difference and hence the electric field across the electrodes does not reach the minimum value necessary for operation.

Another consequence of such systems lies in the necessity of filtering the transmitted electrical signal in order to recognize the useful alternate components, accept those which are reliably due to ionization discharge and exclude those due to the alternating current voltage, at line frequency or multiple thereof thereby causing a consequent reduction of the pass band for the useful signal.

In the specification to be set forth, the "instantaneous sensitivity" of an ionization tube is defined as the probability that a sufficient quantum of radiation of given wave lengths incident on the tube, at a certain instant, is present to trigger an avalanche discharge. "Mean sensitivity" is defined as the mean value of such instantaneous values.

Consequently it may be affirmed that the most important purpose achieved by the present circuit utilizing the ionization tube consists in obtaining, with the simplest means, maximum mean sensitivity at equal operating voltage.

BRIEF DESCRIPTION OF THE INVENTION

The present invention is characterized by providing apparatus for obtaining maximum mean sensitivity at equal operating voltage and further as being capable of providing maximum instantaneous sensitivity, with absolute continuity in time, which result in the significant advantage of providing for the precise detection of the flame even in the presence of a small or weaker amount of radiation within the range of sensitivity of the tube.

The present invention is further characterized as providing apparatus which yields a high power of resolution thereby permitting a precise count of the radiation quanta even when their frequency of incidence is extremely high.

In an electronic flame detection device utilizing an ionization tube sensitive to ultraviolet radiation, problems of the prior art are solved and the above advantages are obtained, according to the invention, through the use of a circuit which powers the tube with direct current and which employs current limiting means serving to extinguish the discharge through ionization. Energy storage means, preferably in the form of a capacitor, is further utilized to store energy by charging up to a constant voltage thereby furnishing the connected energy at each discharge and determining the duration of the discharge. Means are also provided which serve to transfer the pulse signals to the line coupled between the detector and the control unit and which is adapted to provide impedance matching between the detector and the line as well as being adapted to prevent the phenomena of resonance with the energy storage device in order to avoid substantial parasitic periodic oscillations of the voltage across the tube. The above apparatus permits complete discharge of the tube within an extremely short time thus rapidly restoring maximum sensitivity. With this arrangement the phenomenon of saturation of the measurement at very intense radiation flows is limited, resulting in excellent discrimination among the flames, under any practical condition.

The avoidance of the need for special recognizing or filtering circuits further increases the efficiency of transmission of the pulse signals along the transmission line.

BRIEF DESCRIPTION OF THE FIGURES AND OBJECTS

It is therefore one object of the present invention to provide a novel apparatus for powering ionization tubes and the like to obtain maximum efficiency over minimum discharge times while providing a pulsing signal indicative of the presence of a flame which signal is sufficient to provide positive indication of flame presence even in the presence of a small amount of the measured radiation.

The above as well as other objects of the present invention will thus be understood from a consideration of the ensuing specification and drawings in which:

FIGS. 1a and 1b are waveforms useful in describing the prior art apparatus;

FIGS. 1c and 1d show waveforms related to those of 1a and 1b respectively and which are useful in describing the apparatus of the present invention;

Figure 3:
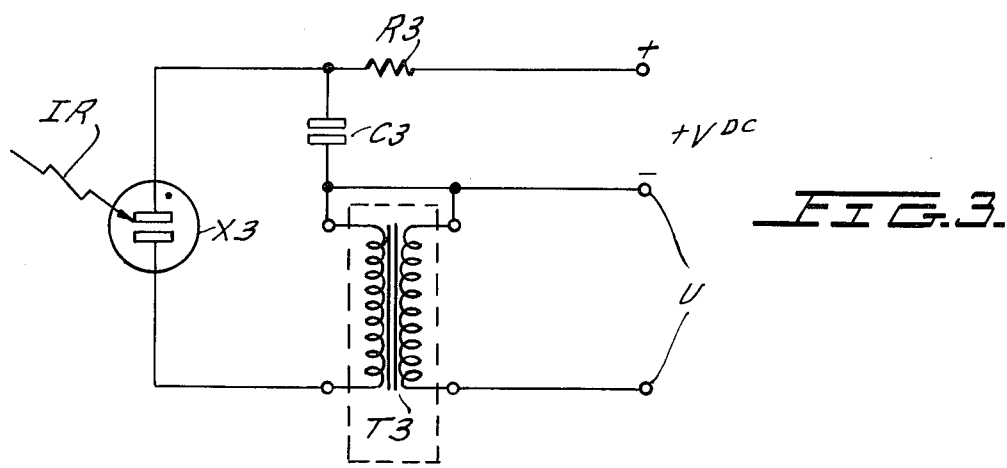
Figure 4:
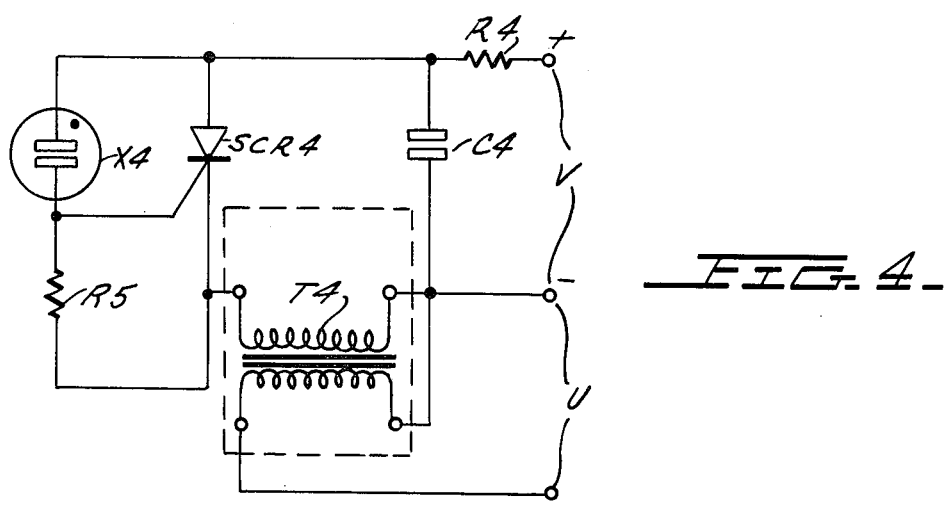

and FIGS. 3 and 4 are schematic diagrams showing preferred embodiments of the present invention.

DETAILED DESCRIPTION OF THE INVENTION

Before describing the nature and mode of operation of the present invention the following definitions are being set forth to clarify the operation of the ionization tube sensitive to ultraviolet rays and of the type employed in the apparatus of the present invention:

$V_{mi}$ — minimum triggering voltage: that value of potential difference between the electrodes of the tubes, below which the avalanche discharge cannot be triggered even in the presence of strong ionizing radiation.

$V_{is}$ — spontaneous triggering voltage: that value of potential difference between the electrodes, above which the avalanche discharge can occur even in the absence of ionizing radiation, and which further corresponds to the dielectric strength of the ionizable gas in the region between the electrodes.

$I_{mm}$ — mimimum maintenance current: that value of the discharge current, below which the discharge cannot be maintained.

As the polarization voltage varies from $V_{mi}$ to $V_{is}$, the sensitivity of the tube (defined as above) varies continuously from zero to 1.

In the practical application of a device utilized for flame detection, the sensitivity must be as high as possible but should be sufficiently below the value 1, which corresponds to spontaneous triggering, which is an extreme condition and is to be avoided.

Referring to FIG. 1a, in the conventional systems where the tube is polarized by a source of alternating voltage $V_1 = V_0 \sin(2\pi ft)$ where $f$ is the frequency, $t$ is time and $V_0$ is the maximum voltage value, the response to the instantaneous sensitivity varies with time in accordance with the qualitative response $s1$ (see FIG. 1b) from which results a mean value of sensitivity equal to S1.

This value cannot be increased without causing a dangerous approach to the instantaneous sensitivity value 1.

In the present invention, the tube is polarized by a direct current source (provided either locally or remotely) having a Value $V_2$ (see FIG. 1c) which lies between $V_{mi}$ and $V_{is}$ at an optimum compromise voltage which on the one hand allows a wide safety margin against spontaneous triggering and on the other hand provides a high sensitivity to the ionizing radiation.

It should be noted in passing that conventional devices exist for ascertaining the safety margin against spontaneous triggering.

As shown in FIG. 1d the instantaneous sensitivity has a constant value $s2$ and the mean sensitivity has a value of S2 equal to the instantaneous sensitivity $s2$. For $V_2 = V_0$ it can be seen that the sensitivity S2 (FIG. 1d) is much greater than the sensitivity S1 (FIG. 1b).

In accordance with the present invention the tube is always capable of producing an ionization discharge, while in conventional systems, with an alternating current supply, the tube is completely insensitive in a wide fraction of the period $1/f$ wherein the time intervals $t_a$, $t_b$ and $t_c$ of FIG. 1b indicate the intervals during which the tube is completely insensitive to radiation regardless of the strength of the radiation present during these time intervals. This difference in behavior is further particularly significant when the intensity of radiation is so weak that the quanta of ionizing radiation arrive in a rarefied and random manner.

The apparatus to be described further requires means for extinguishing the discharge as soon as it occurs, so as to promptly restore the full sensitivity of the tube.

For the extinction, any circuit may be used which acts by limiting the current to a value below $I_{mm}$, as soon as the triggering of the discharge has been detected, with the output of a pulse signal.

The incident radiation is measured by analog or digital count of the pulses. To obtain a good linearity of measurement, that is to prevent the device from reaching a premature saturation in the presence of higher radiation values, it is necessary to obtain the extinction over a very short time interval.

The complexity of the necessary circuits depends essentially on the operating characteristics actually required.

To illustrate the above characteristics reference will now be made to FIG. 2 in which a direct current power source is coupled across the terminals 11 and 12. A resistor $R_2$ of sufficiently high ohmic value is coupled in series between terminal 11 and one electrode of the ionization tube $X_2$ to insure immediate extinction of the discharge. Terminal 12 is further connected to one input terminal of the pulse translator $T_2$ whose other input terminal is coupled to the remaining electrode of the ionizing tube. The output terminals of the translator are coupled to the output terminals U.

In operation the d-c voltage supplied across terminals 11 and 12 is insufficient to permit spontaneous ignition of the tube and is high enough to provide the tube with excellent sensitivity. In the presence of ionizing radiation IR, gas in the tube is ionized causing ignition to establish a closed loop path from the d-c source through terminal 11 resistor $R_2$ ionizing tube $X_2$ and the primary winding of translator $T_2$ to the negative terminal 12 of the d-c source. The pulse developed across the input of the translator has been found to be of insufficient amplitude and of insufficient duration, and hence energy, to enable practical use of the apparatus shown in FIG. 2 when connected to a control unit (not shown for purposes of simplicity) over a line of appreciable length.

Figure 2:
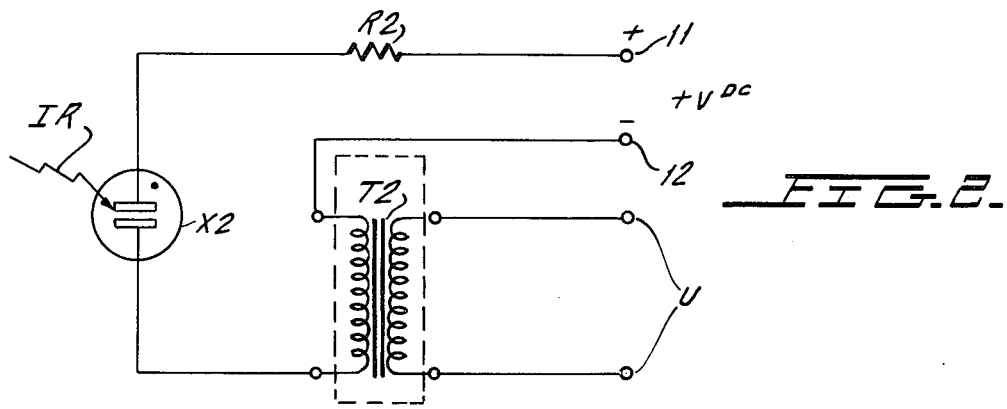
FIG. 2 is a schematic diagram showing an electronic flame detection device useful in describing the characteristics of the present invention.

FIG. 3 shows one preferred embodiment of the present invention which embodies all of the advantages heretofore mentioned and overcome the deficiencies of the circuitry of FIG. 2.

As shown in FIG. 3, an energy storage device, preferably in the form of a capacitor $C_3$ is coupled between the common terminal of $X_3$ and $R_3$ and the upper input and output terminals of translator $T_3$.

In operation and when tube $X_3$ is non-conductive, capacitor $C_3$ charges to the value of the d-c source, which value is judiciously chosen as was described herein above.

In the presence of ionizing radiation IR, tube $X_3$ is ignited causing capacitor $C_3$ to discharge through the primary of the translator $T_3$. As a result the signal developed by the output of the translator is increased through the increase of either the discharge current and/or the duration of the pulse to that maximum value which is actually proved acceptable for all practical uses of the flame detector.

That duration must preferably not exceed 300 $\mu S$ and in practical realizations has a typical value of 200 $\mu S$.

This twofold purpose is served by the capacitor $C_3$, which together with resistor $R_3$, forms a relaxation circuit.

The pulse translator $T_3$ may be of any type provided that it is suitable for the impedance of the transmission line. The adaptation to the transmission line could, of course, be achieved by means of a simple resistance or an arbitrary adaptation network such as for example an amplifier, in place of the transformer shown in FIG. 3. When a transformer is employed, it must be verified that its inductance will not constitute a resonance circuit with the capacitor $C_3$ in order to avoid the above stated disadvantages of an alternating voltage on the electrodes of the tube.

It is therefore highly desirable that the transformer inductance together with the value of the capacitor should constitute a damped and a periodic circuit. The pulse translator can moreover be inserted indiscriminantly at any point in the circuit link formed by $C_3$ and by the tube $X_3$.

Capacitor $C_3$ has a twofold effect of constituting a low impedance for the discharge current, which therefore reaches greater instantaneous values, and further to determine either the energy associated with each pulse or the time necessary for the recovery of the sensitivity of the tube.

In an embodiment in which the direct polarization current $V = 700v$ which was chosen on the basis of the characteristics of the tube used, the optimum values of $R_3$ and $C_3$ are 680K$\Omega$ and 500$_p$F respectively.

FIG. 4 shows another preferred embodiment of the present invention which utilizes a silicon controlled rectifier $SCR_4$ whose anode electrode is coupled to the common terminal between $R_4$ and one electrode of $X_4$, whose cathode electrode is coupled to the common terminal between one input of $T_4$ and one terminal of $R_5$; and whose trigger electrode is coupled to the common terminal between remaining electrode of $X_4$ and remaining terminal of $R_5$. Capacitor $C_4$ is coupled between one terminal of $R_4$ and the righthand input and output terminals of $T_4$.

The operation of the device of FIG. 3 is such that upon ignition of tube $X_3$, $C_3$ discharges through the primary of $T_3$ yielding an output pulse of either greater energy or greater duration than that yielded by the device of FIG. 2. Resistor $R_3$ drives tube $X_3$ into non-conduction so as to return very promptly to the maximum sensitivity value.

The operation of the device of FIG. 4 is such that upon ignition of tube $X_4$ resistor $R_5$ develops a voltage drop sufficient to trigger $SCR_4$ into conduction to serve as a discharge or short circuit path for capacitor $C_4$ which develops a pulse across the primary of $T_4$, which pulse is further developed by the secondary to appear across output terminals U. The apparatus of FIG. 4 constitutes an improvement for the delivery of the available power and a reduction of the recovery time. The silicon control rectifier provides a lower impedance in the conduction phase to furnish pulses of greater power during conduction of the ionization tube.

Although there have been described preferred embodiments of this novel invention, many variations and modifications will now be apparent to those skilled in the art. Therefore, this invention is to be limited, not by the specific disclosure herein, but only by the appended claims.

What is claimed is:

1. In an electronic flame detection device, having normally non-conducting ionization tube means, said tube means forming an ionization discharge therein responsive to the presence of an externally generated quantum of ultraviolet radiations within said tube means, a circuit for the polarization of said tube means comprising:

a source of direct current voltage having an output level chosen to lie between the level of spontaneous ignition of said tube means and the minimum triggering voltage of said tube means;

current limiting means coupled between said source and said tube means for rapidly extinguishing the discharge within said tube means due to ionization, thereby allowing a plurality of discharges to occur, each of said plurality of discharges signifying the presence of an additional quantum of ultraviolet radiations;

energy storage means coupled to said source for storing energy and adapted to be charged to a constant voltage;

and means coupled to said storage means and said tube means for transferring the electrical energy stored by said storage means to an output line when said tube is ignited; the characteristics of said transfer means and said energy storage means being selected so as to prevent substantial parasitic periodic oscillations of the voltage across said tube means after its triggering.

2. The device of claim 1 further comprising an auxiliary electronic device controlled directly by the ionization discharge of the tube means and coupled between said energy storage means and said transfer means for reducing the impedance of the discharge circuit of the energy storage means.

3. The device of claim 2, wherein the auxiliary electronic device comprises a silicon controlled diode.

4. The device of claim 1 wherein said transfer means comprises a pulse transformer whose primary is coupled to said energy storage means and is adapted to connect the output pulse of the energy storage means to a measuring circuit.

5. The device of claim 1 wherein said tube means comprises at least two ionization tubes connected in parallel.

6. The device of claim 1 wherein said energy storage means comprises a capacitor whose discharge energy and/or discharge rate represents the strength of ionizing radiation causing ignition of said tube means.

* * * * *